United States Patent
Tarraga Sánchez et al.

(10) Patent No.: US 10,041,250 B2
(45) Date of Patent: Aug. 7, 2018

(54) MODULAR PANEL FOR THERMAL ENERGY TRANSFER

(75) Inventors: Enrique Tarraga Sánchez, San Pedro del Pinatar (ES); Luis Jordán Fernández, Sant Cugat del Valles (ES)

(73) Assignees: Enrique Tarraga Sanchez, Barcelona (ES); Jaume Cortinas Munoz, Barcelona (ES)

( * ) Notice: Subject to any disclaimer, the term of this patent is extended or adjusted under 35 U.S.C. 154(b) by 746 days.

(21) Appl. No.: 14/129,827

(22) PCT Filed: Jun. 30, 2011

(86) PCT No.: PCT/ES2011/070479
§ 371 (c)(1),
(2), (4) Date: Feb. 27, 2014

(87) PCT Pub. No.: WO2013/001106
PCT Pub. Date: Jan. 3, 2013

(65) Prior Publication Data
US 2014/0196867 A1     Jul. 17, 2014

(51) Int. Cl.
*E04C 2/52* (2006.01)
*E04B 5/48* (2006.01)
(Continued)

(52) U.S. Cl.
CPC ............... *E04C 2/525* (2013.01); *E04B 5/48* (2013.01); *F24D 3/14* (2013.01); *F24D 3/142* (2013.01);
(Continued)

(58) Field of Classification Search
CPC ... E04C 2/525; E04B 5/48; F24D 3/14; F24D 3/142; F24D 3/148; F24F 5/0089; F24F 5/0092; Y10T 29/49629; Y10T 29/49634
(Continued)

(56) References Cited

U.S. PATENT DOCUMENTS 1,771,269 A * 7/1930 Musgrave ................. F24D 3/14
165/49
1,800,150 A * 4/1931 Musgrave ............. F25D 23/061
165/136
(Continued)

FOREIGN PATENT DOCUMENTS

DE      2509841 A    9/1976
DE     10357937 A    4/2005
(Continued)

OTHER PUBLICATIONS

International Search Report of PCT/ES2011/070479 dated Apr. 3, 2012.

*Primary Examiner* — Raheena R Malik
(74) *Attorney, Agent, or Firm* — Edell, Shapiro & Finnan, LLC

(57) ABSTRACT

The present invention relates to a modular panel for thermal energy transfer particularly configured for being used in ceilings and walls, comprising a heat-insulating layer (2) forming a supporting structure demarcated by a lower face (2A), an upper face (2B), two side faces (2C, 2D) and two end faces (2E, 2F). Said panel (1) comprises at least one conducting plate (3) attached to the lower face (2A). Said conducting plate (3) is formed by a groove (31) embedded in the heat-insulating layer (2), defining a longitudinal cavity (32) which is configured to house a hydraulic pipe (6), and defining a longitudinal opening (34) which allows inserting the hydraulic pipe (6); a transfer plate (35) extending on the lower face (2A) and closure means (4) configured to seal the longitudinal opening (34) and press the hydraulic pipe (6) against the groove (31).

18 Claims, 12 Drawing Sheets

(51) Int. Cl.
*F24D 3/14* (2006.01)
*F24F 5/00* (2006.01)

(52) U.S. Cl.
CPC ............ *F24D 3/148* (2013.01); *F24F 5/0089* (2013.01); *F24F 5/0092* (2013.01); *Y10T 29/49629* (2015.01); *Y10T 29/49634* (2015.01)

(58) Field of Classification Search
USPC .............................................. 165/49, 47, 56
See application file for complete search history.

(56) References Cited

U.S. PATENT DOCUMENTS

| | | | | |
|---|---|---|---|---|
| 4,306,616 | A * | 12/1981 | Woods, Jr. ............ | A47F 3/0491 165/136 |
| 4,639,836 | A * | 1/1987 | Crowley, Jr. ............ | H01G 9/15 361/531 |
| 5,454,428 | A * | 10/1995 | Pickard .................. | F24D 3/148 165/178 |
| 5,743,330 | A * | 4/1998 | Bilotta .................... | F24D 3/141 165/171 |
| 7,013,609 | B2 * | 3/2006 | Hydock .................. | F24D 3/142 165/49 |
| 7,021,372 | B2 * | 4/2006 | Pickard .................. | F24D 3/141 165/168 |
| 8,561,677 | B2 * | 10/2013 | Miyamura .............. | F24D 3/146 165/168 |
| 2009/0101306 | A1 * | 4/2009 | Reis ........................ | F28F 13/00 165/56 |
| 2009/0139689 | A1 * | 6/2009 | Kim ........................ | F24D 3/142 165/49 |
| 2012/0267067 | A1 * | 10/2012 | Sullivan .................. | F24D 3/141 165/56 |
| 2014/0367477 | A1 * | 12/2014 | Cha ........................ | F24D 3/146 237/69 |

FOREIGN PATENT DOCUMENTS

| | | | |
|---|---|---|---|
| EP | 1004827 A | 5/2000 | |
| GB | 2383057 A | 6/2003 | |
| WO | 8807158 A | 9/1988 | |
| WO | WO 8807158 A1 * | 9/1988 | ............. F24D 3/142 |

* cited by examiner

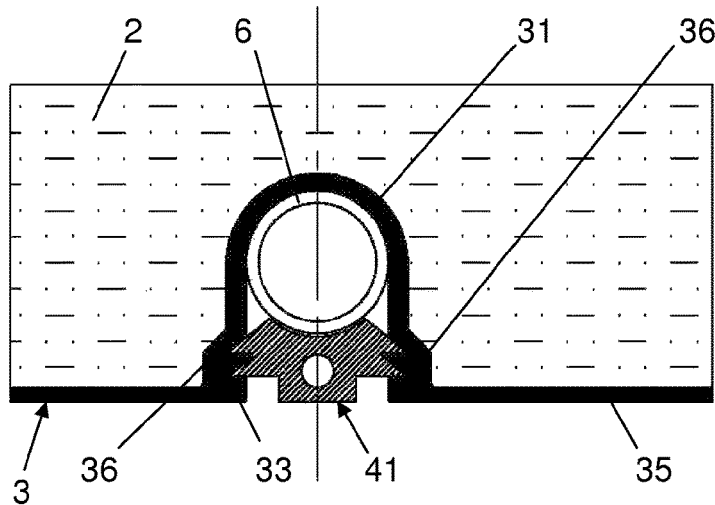
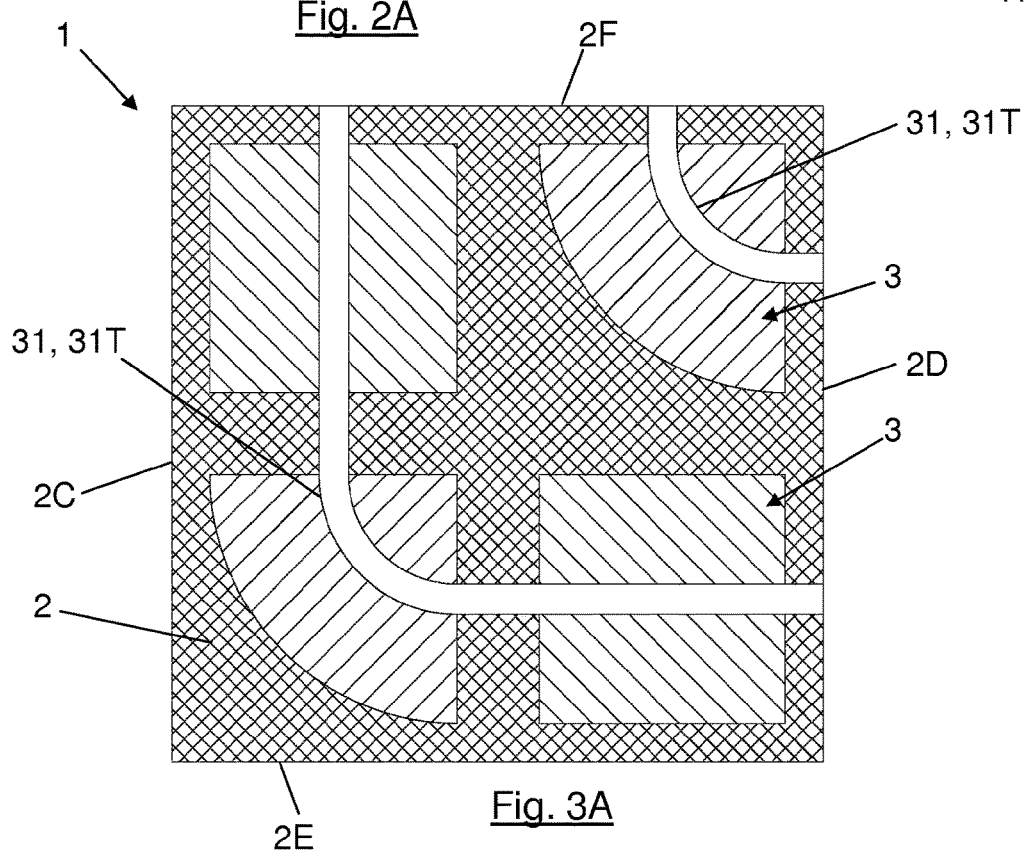
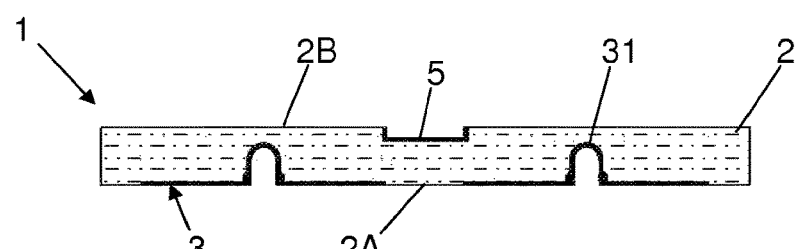

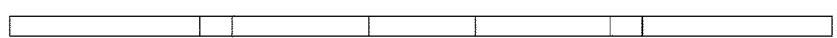
Fig. 9A
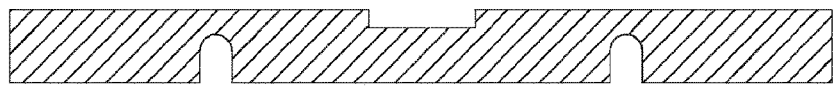
Fig. 9B
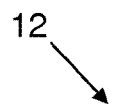
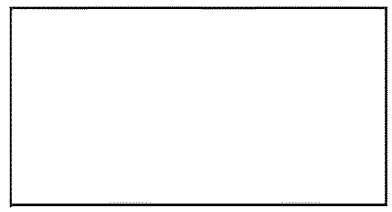
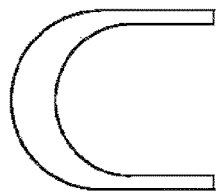
Fig. 10A     Fig. 10C
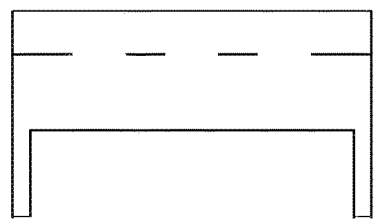
Fig. 10B

MODULAR PANEL FOR THERMAL ENERGY TRANSFER

CROSS REFERENCE TO RELATED APPLICATION

This Application is a 371 of PCT/ES2011/070479 filed on Jun. 30, 2011 and the application is incorporated herein by reference in their entirety.

OBJECT OF THE INVENTION

The present invention relates to a modular panel for thermal energy transfer to a thermal surface for the thermal conditioning of an enclosure obtained by means of a plurality of said modular panels and to an assembly process thereof.

The present invention has especially been designed for thermal conditioning installations in buildings of the type using modular panels in ceilings and/or walls.

The present invention allows improving the energy efficiency of current installations, minimizes the occurrence of breakdowns while the installation is operating because it does not require intermediate connections of the hydraulic circuit between panels, maximizes the exploitation of the available surface of the enclosure to be conditioned and facilitates assembly tasks.

BACKGROUND OF THE INVENTION

Thermal conditioning installations in buildings have three clearly distinguished functional parts. The first one corresponds to the thermal energy generating equipment, such as boilers, coolers, heat pumps, etc. The second one corresponds to the emitting equipment responsible for yielding or extracting heat from the enclosure to be conditioned, such as fan coils, radiators, condensing and/or evaporating units, radiating panels, among others, and to their connections (air ducts, hydraulic pipes, etc.) with the generating equipment. Finally, the third part involves the control systems responsible for managing all thermal and comfort variables of the installation and for assuring the proper operation of the equipment making up the installation.

The present invention particularly focuses on the part corresponding to the emitting equipment, which is a determining factor for the suitable thermal conditioning of the enclosure (thermal power, efficiency, equipment location and distribution, etc.), in addition to assuring suitable comfort conditions (noise, speed and orientation of air flows, condensations, etc.). More specifically, the present invention focuses on the emitting equipment of the group pertaining to modular panels to be used in ceilings and/or walls. Said modular panels offer many advantages with respect to the remaining emitters, i.e., they are more energy efficient, improve room temperature uniformity in the enclosure, are better integrated into the architectural design, generate less noise, do not take up useful spaces beyond that of the typical enclosing elements of the enclosure, do not have parts where dust or bacteria accumulate and require less maintenance.

The modular panels for being used in ceilings and/or walls and which are currently used in installations for the thermal conditioning of enclosures comprise a sandwich or layered structure in which a hydraulic circuit is integrated in a fixed manner.

Document EP1004827 provides a representative example of the modular panels used today. This document describes a self-supporting, modular, prefabricated panel the structure of which is formed by a plasterboard layer and an insulating material layer integrating a plurality of independent hydraulic circuits arranged in coil form. The pipes forming each of the hydraulic circuits are housed directly in the plaster in a fixed manner in cavities machined therein. The different hydraulic circuits are distributed over the panel, forming different independent areas that can be separated from one another, wherein each of them has on its longitudinal edges an inlet connection and an outlet connection of the circuit. The dimensions of the panel can be modified within a limited number of options, separating with respect thereto a greater or lesser number of the independent areas forming it.

Current panels like the one described above have considerable drawbacks affecting both the panel itself and the thermal surface obtained by means thereof, as well as assembly process for assembling said surface, as can be inferred below.

In terms of the panel itself, it has a modularity limited to practically only three or four different sizes which are generally obtained from a standard, large-sized panel, so it offers very little assembly flexibility. Furthermore, the power output of the panel is limited by the low heat conduction capacity of the plaster. Finally, the integration of the hydraulic circuit makes the panel more expensive, more complex to manufacture and less manageable, and it does not allow access to said circuit for maintenance purposes without previously having to break the panel itself.

In terms of the surface obtained by means of current panels, particularly the drawbacks affecting the proper operation of the installation and the low exploitation of the available surface of the enclosure should be pointed out. In this sense, it is essential to mention the large number of connections to be made during installation both to maintain the continuity of the hydraulic circuits forming one and the same panel and their connection to the circuits of adjacent panels. All this, in addition to the long assembly time it represents results in a considerable increase of the risk of breakdowns, mainly due to the loss of leak-tightness of the circuit due to poorly made connections. The low modularity of the panels furthermore does not allow covering the entire available space of the enclosure, more se when it has intermediate structural elements (columns) or an irregular geometry, so the uniformity in the distribution of the hydraulic circuits is significantly reduced, the resulting thermal distribution being far from the most ideal and the installed thermal power being less than the potential offered by the enclosure. Furthermore, current thermal surfaces are rather inflexible with regard to the frequent expansions of the pipes of the hydraulic circuit because they are completely fixed in the modular panels. This usually causes deformations of the cavities in which they are housed and thereby allows the creation of air pores, further reducing the power output of the installation.

Finally, in terms of the drawbacks of the assembly process, the significant time intended for such assembly should again be pointed out, especially due to making the necessary number of numerous connections as the different hydraulic circuits are not continuous. Furthermore, it is not easy to handle the panels due to their considerable size and weight taking into account that they integrate the hydraulic pipes.

The present invention solves in a fully satisfactory manner the problems set forth above, improving the energy efficiency of current installations, minimizing the occurrence of breakdowns while the installation is operating, maximizing the exploitation of the available surface of the enclosure to be conditioned and facilitating the installation assembly tasks.

DESCRIPTION OF THE INVENTION

According to a first object of the present invention a modular panel for thermal energy transfer particularly configured for being used in ceilings and walls is described below.

Said modular panel comprises a heat-insulating layer preferably having a square or rectangular base, forming a supporting structure demarcated by at least one lower face, an upper face, two side faces and two end faces. The materials which can be used to form the insulation layer are great in number and very diverse, such as for example synthetic polymer foams (such as polyisocyanurate, polyurethane, etc.), mineral wools and natural plant-based insulations, among others.

In turn, the panel also comprises at least one preferably aluminum conducting plate attached to the lower face of the heat-insulating layer. The conducting plate is likewise formed by:
- a groove embedded in the heat-insulating layer defining a longitudinal cavity which is configured to house a hydraulic pipe, said groove in turn being finished by two longitudinal edges which are flush with the lower face, defining a longitudinal opening which is configured to allow inserting the hydraulic pipe;
- a transfer plate prolonging from at least one of the longitudinal edges and extending on the lower face; and
- closure means configured to seal the longitudinal opening and press the hydraulic pipe against the groove.

Therefore, the modular panel of the present invention does not incorporate the pipe responsible for transporting the heat-carrying fluid, but it incorporates the means necessary for said pipe to be assembled after the installation of the panel itself. This allows easily machining the dimensions of the panel during the installation both longitudinally and transversely so it can be adapted to the geometric characteristics of the enclosure. Furthermore, once the modular panels are installed, the pipe can be readily accessed for maintenance purposes without needing to break said panels.

In terms of the pipe itself, it can be made of any material enabling assembly in the groove, though preferably plastic materials, such as polypropylene, among others which allow installation without the need for tools, are used. Preferably, the material used for the pipe further has high erosion resistance, neither rusts nor deteriorates due to contact with other constructive elements, such as mortars or additives thereof, concretes and plaster, among others. It also has small expansive forces, a low coefficient of friction and a low pressure drop of the heat-carrying fluid.

The transfer plate preferably prolongs from both longitudinal edges of the groove to provide better thermal distribution and in the attempt to cover the maximum possible surface of the lower face of the insulation layer. The entire modular panel is thereby converted into a heat-emitting element, the purpose of which is to extract or transfer the heat from/to the surrounding area or the surfaces close to it.

The closure means have a noteworthy and important function because they are responsible for correctly sealing the panel after the assembly of the hydraulic pipe to assure its leak-tightness, and they further press it against the groove in order to conduct heat between both elements. The configuration of the closure means allows several possible solutions, but such solutions preferably comprise:
- a longitudinal embossment having a toothed profile arranged in each of the longitudinal edges; and
- an elastic closure element configured to compensate for the expansions of the hydraulic pipe caused by the temperature changes thereof, wherein said closure element is formed by:
    - two longitudinal sides having a toothed profile fitting with the longitudinal embossments to allow securing the closure element to the conducting plate and sealing the longitudinal opening, assuring the leak-tightness of the longitudinal cavity;
    - a longitudinal seat which is configured to press the hydraulic pipe against the groove, assuring the thermal energy transfer between the hydraulic pipe and the conducting plate; and
    - a lower base which is flush with the lower face.

Said configuration of the closure means is particularly interesting because it is functionally very efficient, simple, economical and easy to assemble.

On the other hand, the panel comprises at least one fixing support attached to the upper face in order to facilitate fixing the panel to any structural element and to allow fixing finishing elements thereon such as plasterboards, wooden boards, stone slabs, decorative metal plates or other prefabricated surfacing elements, etc. Preferably, said support is arranged in an alternating position with the grooves, although according to the path thereof eventual intersections may occur. Said support allows several possible configurations, however the fixing support is preferably embedded in the heat-insulating layer occupying the longitudinal central axis thereof and being U-shaped galvanized steel, the ends of which are flush with the upper face of the thermal insulation or under the same.

The grooves of the panel can adopt different paths throughout same, giving rise to different panels which allow creating any type of hydraulic circuit, no matter how complex it is, once attached, thereby assuring an ideal thermal distribution of the enclosure. The number of grooves per panel and the path thereof allows many combinations, giving rise to as many other different panels, nevertheless the most characteristic panels are described below.

Straight modular panel, the grooves thereof follow a straight path starting in one end face and ending in the other end face.

Turning modular panel, the groove of at least one conducting plate thereof follows a 90° path starting in one end face and ending in a side face.

Change of direction modular panel, the groove of at least one conducting plate thereof follows a 180° path starting and ending in one of the end faces.

According to a second object of the present invention, a thermal surface for the thermal conditioning of an enclosure obtained by means of a plurality of the modular panels described above is described below.

Said thermal surface comprises a plurality of modular panels which are arranged adjacent to one another, their conducting plates being linked to one another and the grooves of said plates forming a continuous longitudinal cavity which is configured to house the hydraulic pipe, wherein said longitudinal cavity defines a continuous longitudinal opening which is configured to allow inserting the hydraulic pipe therein, forming a hydraulic circuit without the need for intermediate connections between panels.

Likewise, in order to compensate for the expansions said hydraulic pipes frequently experience due to their temperature changes, an expansion joint made of an elastic material having the same cross-section as that corresponding to the adjacent panels is arranged at the linking points of the conducting plates of said adjacent panels forming the thermal surface. Furthermore, even though the closure means exert pressure on the hydraulic pipe to assure its contact with the groove, said pipe is not fixed thereto and has certain mobility. The mobility of the pipe and the expansion joints between panels allow absorbing the expansions occurring while the installation is operating. The pipe therefore has certain mobility which, together with the expansion joints, prevents the creation of air pores and increases the durability of the installation.

Furthermore, to protect the pipe during installation the surface comprises a metal protective part arranged in the lower face of at least one modular panel, wherein said protective part is configured to cover the lower portion of the hydraulic pipe section at the points where the fixing support intersects the groove. The protective parts play an important role during the assembly of the installation because they allow operators to work with the certainty that they are not damaging the pipe.

Finally, the thermal surface additionally comprises blind panels formed by:
- a heat-insulating layer forming a supporting structure demarcated by at least one lower face, an upper face, two side faces and two end faces; and
- a fixing support attached to the upper face.

Said blind panels are configured to fill the empty spaces remaining in the thermal surface once the modular panels are arranged. In other words, they allow covering possible gaps between panels and enclosing elements, between panels and intermediate structural elements or between the panels themselves, thereby improving thermal and acoustic insulation. This along with the complete transformation capacity of the modular panels and the multipurpose nature thereof to configure any hydraulic circuit allows completely exploiting the available surface of the enclosure, obtaining maximum uniformity in the distribution of the hydraulic circuit, and therefore an ideal thermal distribution and greater installed thermal power.

According to a third object of the present invention, an assembly process for assembling the thermal surface for the thermal conditioning of an enclosure described above is described below.

Said process comprises the steps of:
a) selecting the modular panels and adapting the dimensions thereof depending on the geometry of the enclosure and on the hydraulic circuit to be installed;
b) placing the modular panels adjacent to one another on a support structure, linking their conducting plates so that the grooves thereof form the continuous longitudinal cavity and the continuous longitudinal opening;
c) inserting the hydraulic pipe into the continuous longitudinal opening and housing it in the continuous longitudinal cavity, forming the hydraulic circuit without the need for intermediate connections between panels; and
d) fixing the closure means to the conducting plates to seal the continuous longitudinal opening and press the hydraulic pipe against the grooves thereof.

In this sense, the complete lack of connections between adjacent panels, which drastically reduces the installation assembly time, should be pointed out.

Likewise, the process additionally comprises the step of:
e) covering the empty spaces lacking modular panels by means of blind panels previously cut according to the geometry of said spaces.

Likewise, the process additionally comprises the steps of:
f) applying a sealing paste layer on the lower face of the modular panels and of the blind panels; and g) placing finishing elements on the sealing paste layer, fixing said finishing elements to the support structure and to the fixing supports using screws.

Finally, the support structure on which the panels are placed allows a number of possibilities. In this sense, the support structure can directly be the enclosing element (ceiling or wall) on which the thermal surface is installed or it can be installed on a suspended or back to back structure thereof to configure a false ceiling or a wall surfacing, respectively, among other possibilities. Nevertheless, the present process also contemplates the possibility of forming a particular structure which offers added advantages. In this sense, optionally, step b) of the assembly process of the present invention comprises the steps of:
b.1. placing H-beams on the support structure equidistantly at a distance coinciding with the width of the modular panels; and
b.2. placing the modular panels with their side faces fitting between the flanges of two contiguous beams.

This structural configuration even further streamlines the installation assembly tasks.

It is important to mention that all the steps of the process can be carried out in series and/or in parallel by different work teams, allowing the assembly of the thermal surface to be very flexible. For example, a first team starts by selecting and placing the modular and blind panels, a second team gradually inserts the hydraulic pipe and fixes the closure means as the first team advances, and a third team gradually places the finishing elements.

BRIEF DESCRIPTION OF THE DRAWINGS

A set of drawings which help to better understand the invention and which are expressly related to different preferred embodiments of said invention, presented as non-limiting examples thereof, is very briefly described below.

FIG. 2A is a detailed section view of a groove after the assembly of a hydraulic pipe.

FIG. 2B is a section view of the closure element.

FIG. 3A is a plan view of the lower face of the modular panel of the present invention according to a turning path.

FIG. 3B is a front view of the modular panel of the present invention according to a turning path.

FIG. 9A is a profile view of the expansion joint.

FIG. 9B is a front view of the expansion joint.

FIG. 10A is a plan view of the protective part.

FIG. 10B is a front view of the protective part.

FIG. 10C is a profile view of the protective part.

PREFERRED EMBODIMENT OF THE INVENTION

Figure 1A:
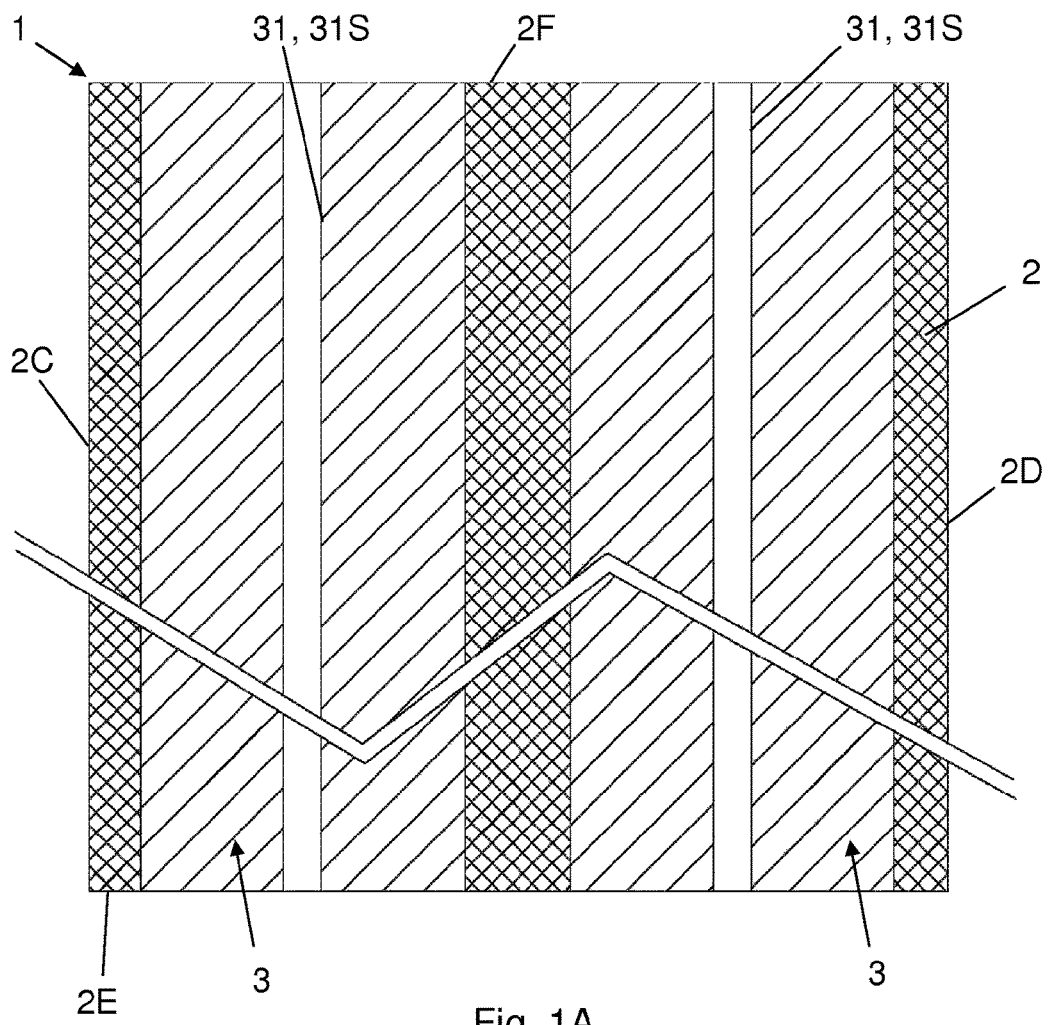
FIG. 1A is a plan view of the lower face of the modular panel of the present invention according to a straight path.
Figure 1B:
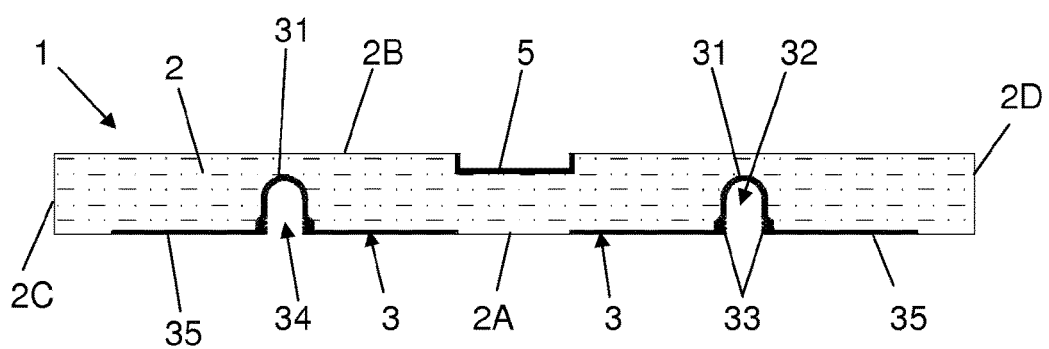
FIG. 1B is a front view of the modular panel of the present invention according to a straight path.

FIGS. 1A and 1B respectively show a plan view of the lower face of a modular panel (1) and a front view thereof according to a straight path.

As can be seen, the modular panel (1), the length of which is not depicted in its entirety in the present example, comprises a heat-insulating layer (2) forming a supporting structure demarcated by a lower face (2A), an upper face (2B), two side faces (2C, 2D) and two end faces (2E, 2F). In turn, the panel (1) comprises two conducting plates (3) attached to the lower face (2A) of the heat-insulating layer (2). Likewise, each conducting plate (3) is formed by:
- a groove (31) embedded in the heat-insulating layer (2), defining a longitudinal cavity (32) which is configured to house a hydraulic pipe (6), not depicted, said groove (31) in turn being finished by two longitudinal edges (33) which are flush with the lower face (2A), defining a longitudinal opening (34) which is configured to allow inserting the hydraulic pipe (6);
- a transfer plate (35) prolonging from the longitudinal edges (33) and extending on the lower face (2A); and
- closure means (4), FIGS. 2A and 2B, configured to seal the longitudinal opening (34) and press the hydraulic pipe (6) against the groove (31).

Figure 13:
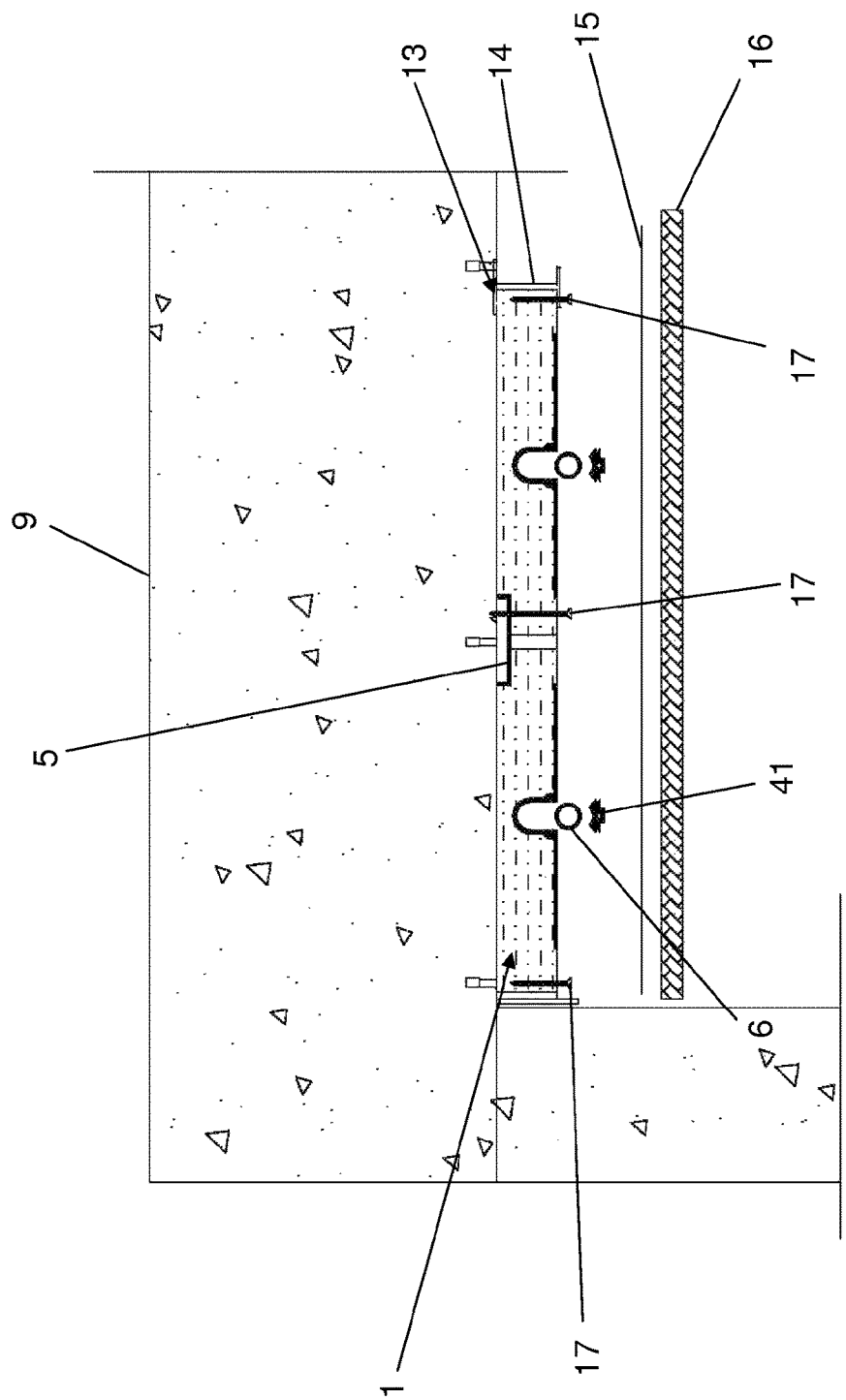
FIG. 13 is a detailed exploded view of the assembly of FIG. 12.

To facilitate fixing the panel (1) to any structural element and to allow fixing finishing elements (16) thereon, FIG. 13, the panel comprises a fixing support (5) attached to the upper face (2B) arranged in an alternating position with the grooves (31). Said support (5) is embedded in the heat-insulating layer (2) occupying the longitudinal central axis thereof and being U-shaped galvanized steel, the ends of which are flush with the upper face (2B) of the thermal insulation (2).

This first example shows a straight modular panel (1), the grooves (31) of which follow a straight path (31S) starting in the end face (2E) and ending in the end face (2F).

FIGS. 2A and 2B respectively show a detailed section view of a groove (31) after the assembly of a hydraulic pipe (6).

As can be seen, the closure means (4) comprise:
a longitudinal embossment (36) having a toothed profile arranged in each of the longitudinal edges (33); and
an elastic closure element (41) configured to compensate for the expansions of the hydraulic pipe (6) caused by the temperature changes thereof, wherein said closure element (41) is formed by:
- two longitudinal sides (42) having a toothed profile fitting with the longitudinal embossments (36) to allow securing the closure element (41) to the conducting plate (3) and sealing the longitudinal opening (34), assuring the leak-tightness of the longitudinal cavity (32);
- a longitudinal seat (43) which is configured to press the hydraulic pipe (6) against the groove (31), assuring the thermal energy transfer between the hydraulic pipe (6) and the conducting plate (3); and
- a lower base (44) which is flush with the lower face (2A).

FIGS. 3A and 3B respectively show a plan view of the lower face of the modular panel (1) and a front view thereof according to a turning path. This second example shows a turning modular panel (1), the grooves (31) of which follow a 90° path (31T) starting in one end face (2E, 2F) and ending in a side face (2C, 2D).

Figure 4A:
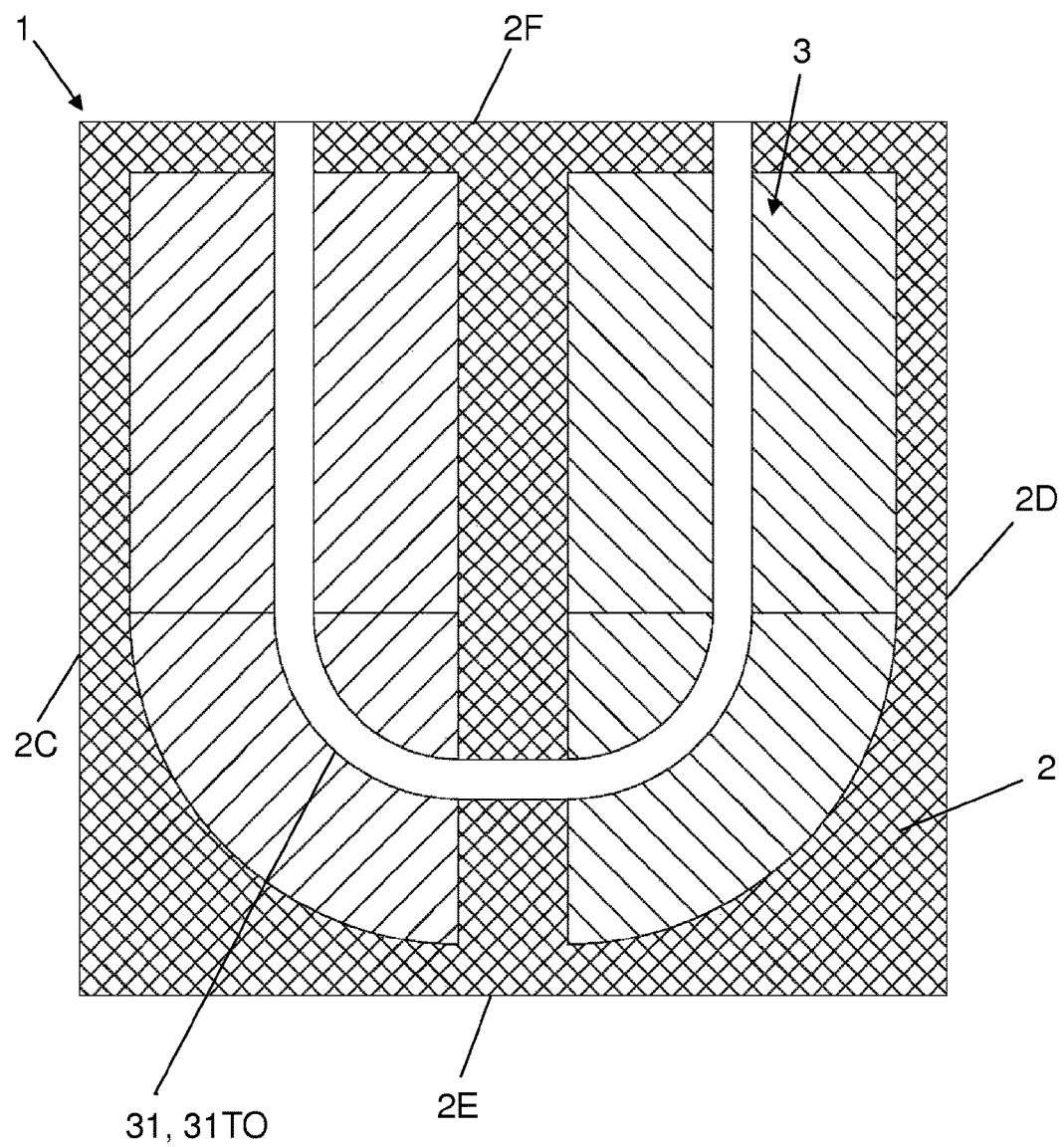
FIG. 4A is a plan view of the lower face of the modular panel of the present invention according to a change of direction path.
Figure 4B:
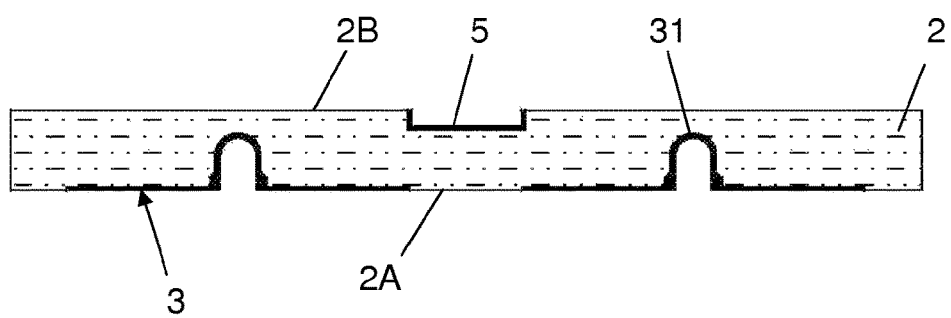
FIG. 4B is a front view of the modular panel of the present invention according to a change of direction path.

FIGS. 4A and 4B respectively show a plan view of the lower face of the modular panel (1) and a front view thereof according to a change of direction path. This third example shows a change of direction modular panel (1), the grooves (31) of which follow a 180° path (31TO) starting and ending in the end face (2F).

Figure 5A:
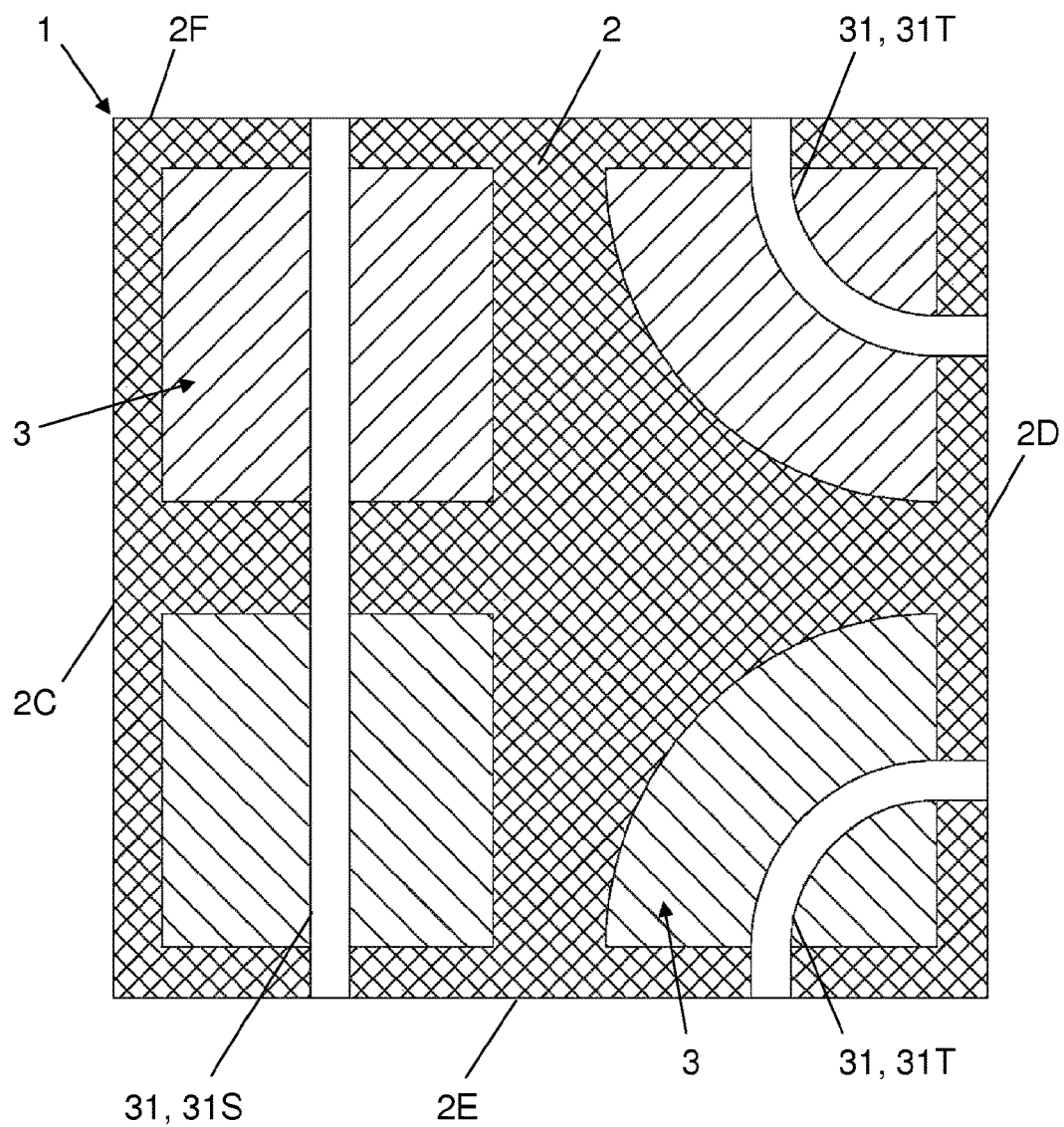
FIG. 5A is a plan view of the lower face of the modular panel of the present invention according to a combined path.
Figure 5B:
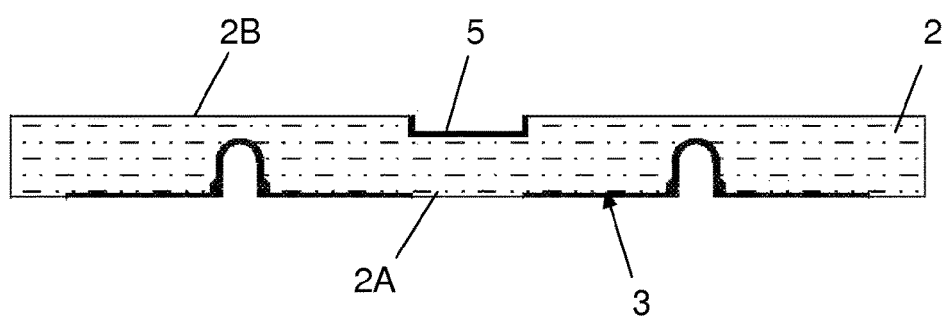
FIG. 5B is a front view of the modular panel of the present invention according to a combined path.

FIGS. 5A and 5B respectively show a plan view of the lower face of the modular panel (1) and a front view thereof according to a combined path. This fourth example shows a combined modular panel (1), the grooves (31) of which follow straight paths (31S) and 90° paths (31T).

Figure 6:
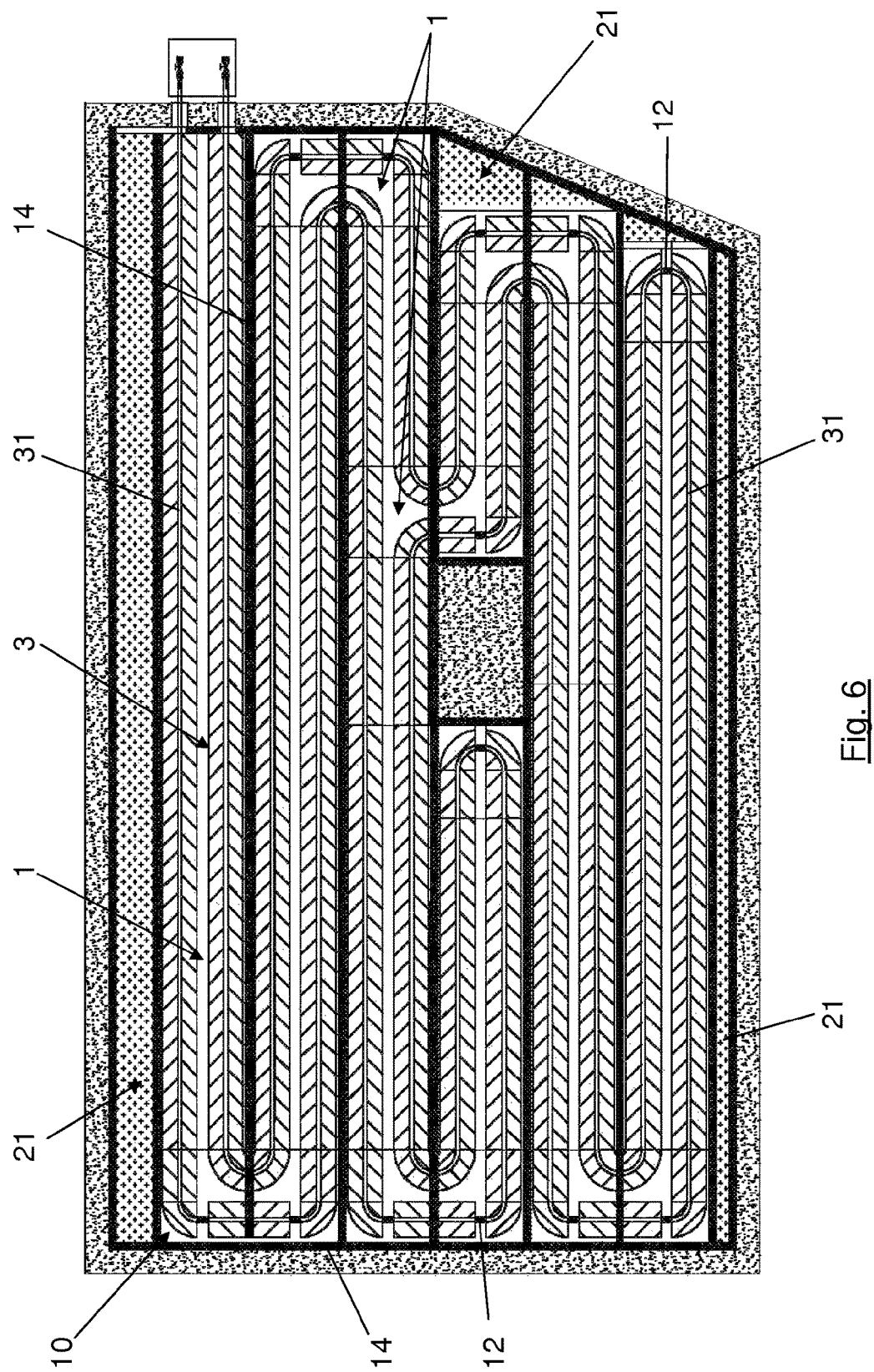
FIG. 6 is a bottom view of a thermal surface for the thermal conditioning of an enclosure according to an example of the assembly of the present invention.

FIG. 6 shows a bottom view of a thermal surface (10) for the thermal conditioning of an enclosure according to an example of the assembly of the present invention.

Figure 8:
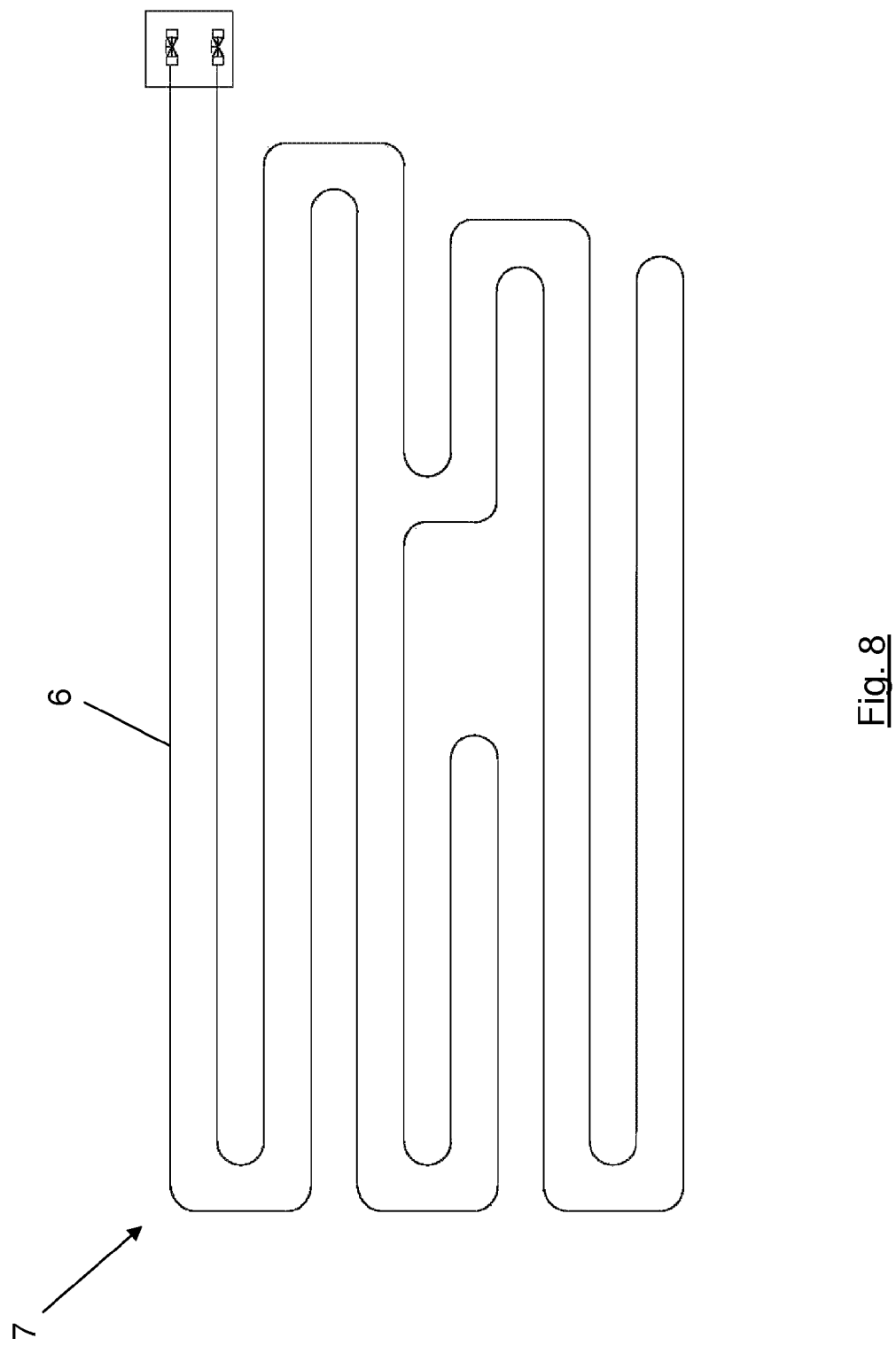
FIG. 8 is a diagram of the hydraulic circuit of the thermal surface of FIG. 6.

Said thermal surface (10) comprises a plurality of modular panels (1) which are arranged adjacent to one another, their conducting plates (3) being linked to one another and the grooves (31) of said plates (3) forming a continuous longitudinal cavity (32) which is configured to house the hydraulic pipe (6), wherein said longitudinal cavity (32) defines a continuous longitudinal opening (34) which is configured to allow inserting the hydraulic pipe (6) therein, forming a hydraulic circuit (7), FIG. 8, without the need for intermediate connections between panels (1).

Figure 7:
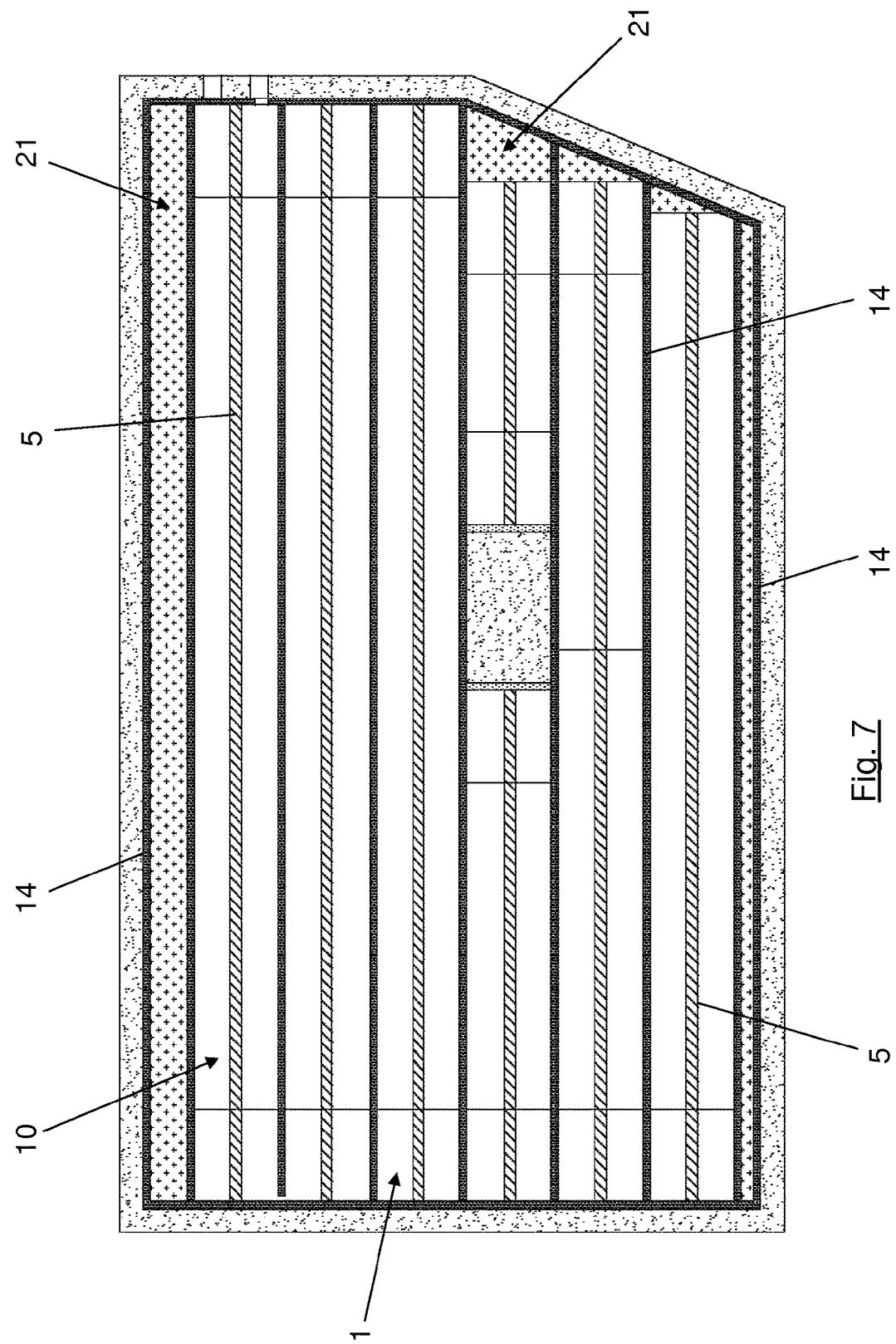
FIG. 7 is a top view of the thermal surface of FIG. 6.

FIG. 7 shows a top view of the thermal surface (10) of FIG. 6, in which the fixing supports (5) can be seen.

FIG. 8 shows a diagram of the hydraulic circuit (7) of the thermal surface (10) of FIG. 6. As can be seen there are no intermediate connections between panels (1), the general connection of the circuit being located outside the enclosure. If required by the characteristics of the installation, more than one hydraulic circuit per enclosure can be configured, with their respective general connections located outside or inside the enclosure, depending on where the respective connections transporting the heat-carrying fluid from the generating equipment are located.

FIGS. 9A and 9B respectively show a profile view and a front view of the expansion joint (11). Said joints (11) are arranged at the linking points of the conducting plates (3) of adjacent panels (1) forming the thermal surface (10), having the same cross-section as that corresponding to said adjacent panels (1).

FIGS. 10A, 10B and 10C respectively show a plan view, a front view and a profile view of the protective part (12). Said parts (12) are arranged, after installing the pipe (6), in the lower face (2A) of the modular panels (1) at the points where the fixing support (5) intersects the groove (31), FIG. 6, to cover the lower portion of the hydraulic pipe section (6) arranged at said points.

Figure 11A:
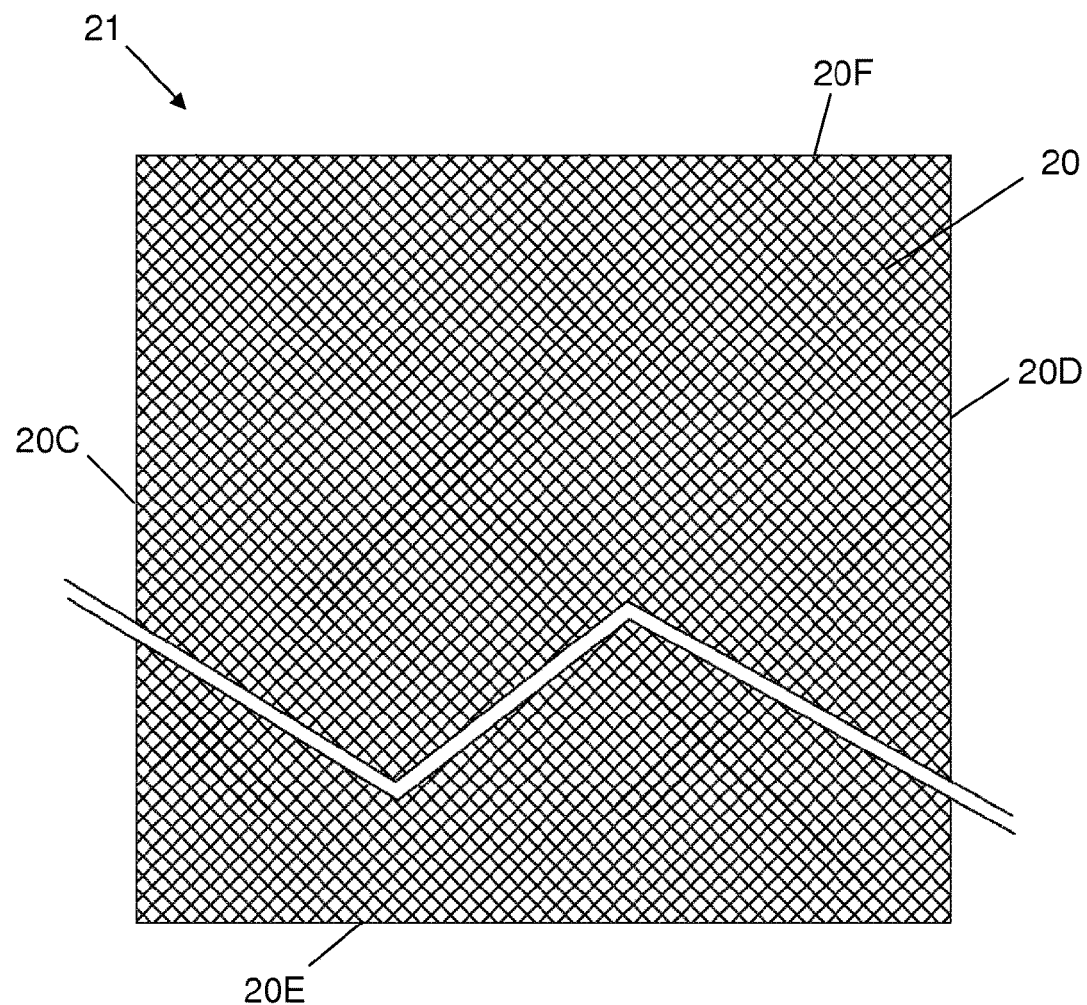
FIG. 11A is a plan view of the lower face of the blind panel of the present invention.
Figure 11B:
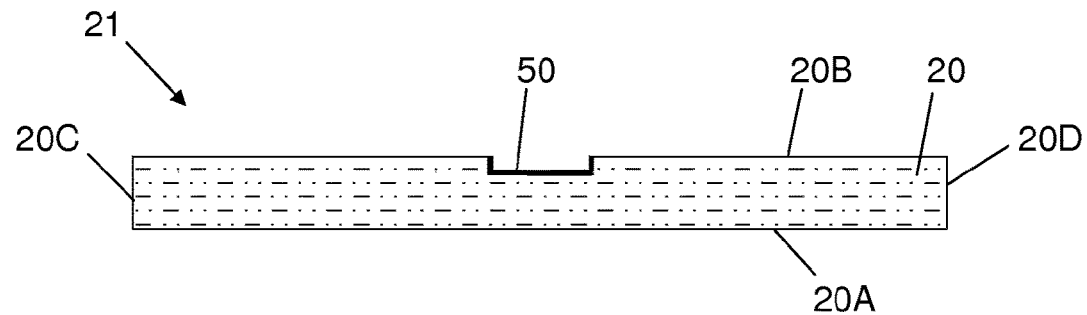
FIG. 11B is a front view of the blind panel of the present invention.

FIGS. 11A and 11B respectively show a plan view of the lower face of the blind panel (21) and a front view thereof.

As can be seen the blind panel (21), the length of which is not depicted in its entirety in the present example, is formed by:

a heat-insulating layer (20) forming a supporting structure demarcated by a lower face (20A), an upper face (20B), two side faces (20C, 20D) and two end faces (20E, 20F); and a fixing support (50) attached to the upper face (20B).

Said blind panels (21) are configured to fill the empty spaces remaining in the thermal surface (10) once the modular panels (1) are arranged, FIGS. 6 and 7. Said empty spaces are generally in the perimetric areas of the enclosure or in areas perimetric to intermediate structural elements.

Figure 12:
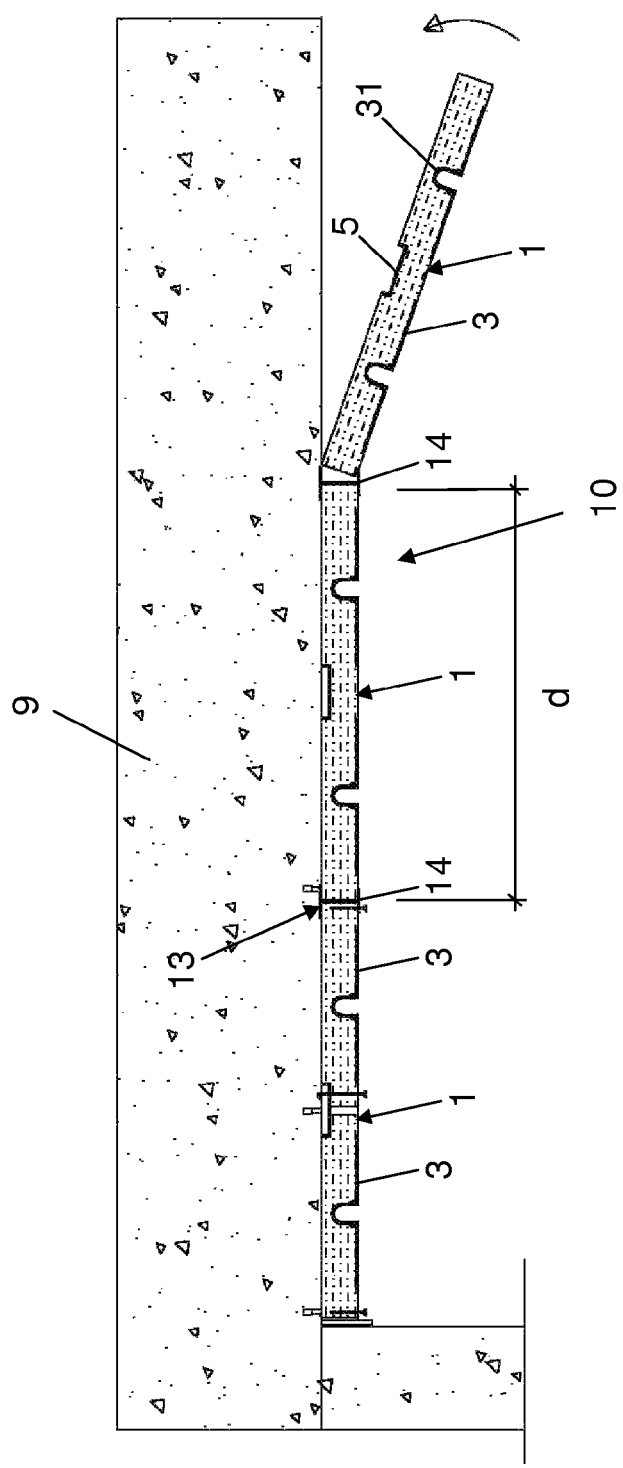
FIG. 12 is an example of the assembly of a thermal surface directly on an enclosing element.

FIGS. 12 and 13 show an example of the assembly of a thermal surface (10) directly on an enclosing element (9). The assembly process comprises the steps of:
a) selecting the modular panels (1) and adapting the dimensions thereof depending on the geometry of the enclosure and of the hydraulic circuit (7) to be installed;
b) placing the modular panels (1) adjacent to one another on a support structure (13), linking their conducting plates (3) so that the grooves (31) thereof form the continuous longitudinal cavity (32) and the continuous longitudinal opening (34);
c) inserting the hydraulic pipe (6) into the continuous longitudinal opening (34) and housing it in the continuous longitudinal cavity (32), forming the hydraulic circuit (7) without the need for intermediate connections between panels (1);
d) fixing the closure means (4) to the conducting plates (3) to seal the continuous longitudinal opening (34) and press the hydraulic pipe (6) against the grooves (31) thereof;
e) covering the empty spaces lacking modular panels (1) by means of blind panels (21) previously cut according to the geometry of said spaces;
f) applying a sealing paste layer (15) on the lower face (2A, 20A) of the modular panels (1) and of the blind panels (21); and
g) placing finishing elements (16) on the sealing paste layer (15), fixing said finishing elements (16) to the support structure (13) and to the fixing supports (5, 50) using screws (17) or other equivalent fixing means.

This example contemplates a particular structure offering added advantages. In this sense, the assembly process of the present example comprises the steps of:
b.1. placing H-beams (14) on the support structure (13) equidistantly at a distance (d) coinciding with the width of the modular panels (1); and
b.2. placing the modular panels (1) with their side faces (2C, 2D) fitting between the flanges of two contiguous beams (14).

Figure 14:
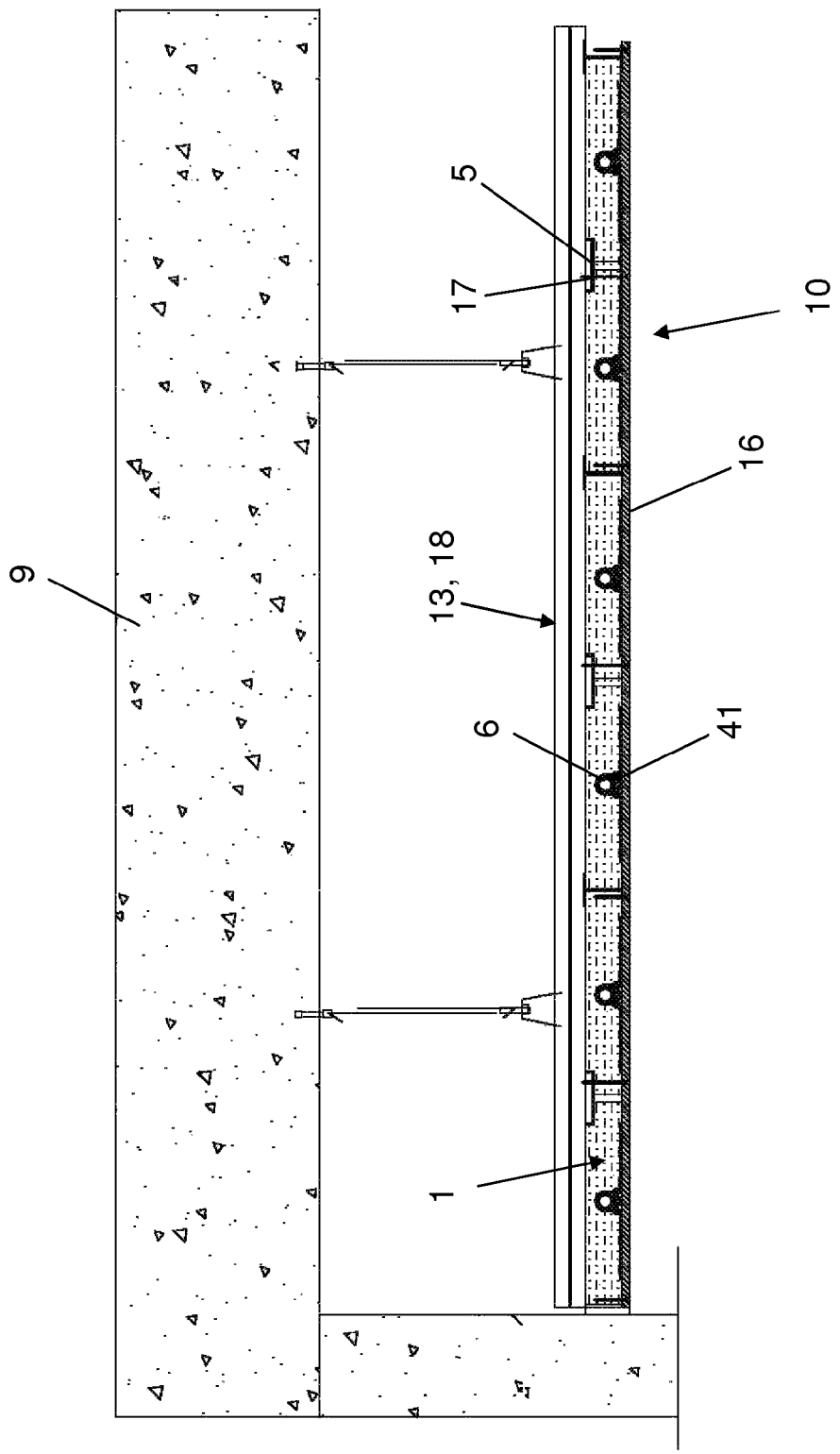
FIG. 14 is an example of the assembly of a thermal surface on a suspended structure.

FIG. 14 shows an example of the assembly of a thermal surface (10) on a suspended structure (18).

The invention claimed is:

1. A modular panel for thermal energy transfer, particularly configured for being used in ceilings and walls, comprising:
   a heat-insulating layer forming a supporting structure demarcated by at least a lower face, an upper face, two side faces and two end faces;
   at least two spatially separated conducting plates, each conducting plate disposed on and attached to only the lower face of the heat-insulating layer without covering said end faces and only partially covering the surface of said lower face, each conducting plate being formed by:
      a groove embedded in the heat-insulating layer defining a longitudinal cavity which is configured to house a hydraulic pipe, said groove in turn being finished by two longitudinal edges which are flush with the lower face, said groove defining a longitudinal opening which is configured to allow inserting the hydraulic pipe;
      a transfer plate prolonging from at least one of the longitudinal edges and extending on the lower face; and
      a closing device disposed in said longitudinal opening and configured to seal the longitudinal opening and press the hydraulic pipe against the groove.

2. The modular panel for thermal energy transfer according to claim 1 wherein the closing device comprises:
   a longitudinal embossment having a toothed profile arranged in each of the longitudinal edges; and
   wherein said closing device is an elastic closure element configured to compensate for the expansions of the hydraulic pipe caused by temperature changes thereof, wherein said elastic closure element is formed by:
      two longitudinal sides having a toothed profile fitting with the longitudinal embossments to allow securing the closure element to the conducting plate and sealing the longitudinal opening, assuring the leak-tightness of the longitudinal cavity;
      a longitudinal seat which is configured to press the hydraulic pipe against the groove, assuring the thermal energy transfer between the hydraulic pipe and the conducting plate; and
      a lower base which is flush with the lower face.

3. The modular panel for thermal energy transfer according to claim 1, comprising a fixing support attached to the upper face.

4. The modular panel for thermal energy transfer according to claim 3, wherein the fixing support is embedded in the heat-insulating layer and is U-shaped.

5. The modular panel for thermal energy transfer according to claim 1, wherein the groove of at least one conducting plate follows a straight path starting in the end face and ending in the end face.

6. The modular panel for thermal energy transfer according to claim 1, wherein the groove of at least one conducting plate follows a 90° path starting in an end face and ending in a side face.

7. The modular panel for thermal energy transfer according to claim 1, wherein the groove of at least one conducting plate follows a 180° path starting and ending in one of the end faces.

8. A thermal surface for the thermal conditioning of an enclosure comprising a plurality of modular panels according to claim 1, wherein the modular panels are arranged adjacent to one another, their conducting plates being linked to one another and the grooves of said plates forming a continuous longitudinal cavity which is configured to house the hydraulic pipe, wherein said longitudinal cavity defines a continuous longitudinal opening which is configured to allow inserting the hydraulic pipe therein, forming a hydraulic circuit without the need for intermediate connections between panels.

9. The thermal surface for the thermal conditioning of an enclosure according to claim 8, wherein an expansion joint made of an elastic material having the same cross-section as that corresponding to the adjacent panels is arranged at the linking points of the conducting plates of said adjacent panels.

10. The thermal surface for the thermal conditioning of an enclosure according to claim 8 comprising a metal protective part arranged in the lower face of at least one modular panel, wherein said protective part is configured to cover the lower portion of the hydraulic pipe section at the points where the fixing support intersects the groove.

11. The thermal surface for the thermal conditioning of an enclosure according to claim 8 further comprising blind panels formed by:
  a heat-insulating layer forming a supporting structure demarcated by at least one lower face, an upper face, two side faces and two end faces; and
  a fixing support attached to the upper face;
  wherein said blind panels are configured to fill the empty spaces remaining in the thermal surface once the modular panels are arranged.

12. An assembly process for assembling the thermal surface for the thermal conditioning of an enclosure according to claim 8 comprising:
  a) selecting the modular panels and adapting the dimensions thereof depending on the geometry of the enclosure and of the hydraulic circuit to be installed;
  b) placing the modular panels adjacent to one another on a support structure, linking their conducting plates so that the grooves thereof form the continuous longitudinal cavity and the continuous longitudinal opening;
  c) inserting the hydraulic pipe into the continuous longitudinal opening and housing it in the continuous longitudinal cavity, forming the hydraulic circuit without the need for intermediate connections between panels; and
  d) fixing the closing device to the conducting plates to seal the continuous longitudinal opening and press the hydraulic pipe against the grooves thereof.

13. The assembly process according to claim 12 further comprising:
  e) covering the empty spaces lacking modular panels by means of blind panels previously cut according to the geometry of said spaces.

14. The assembly process according to claim 13 further comprising:
  f) applying a sealing paste layer on the lower face of the modular panels and of the blind panels; and
  g) placing finishing elements on the sealing paste layer, fixing said finishing elements to the support structure and to the fixing supports using screws.

15. The assembly process according to claim 12, wherein step b) further comprises:
  b.1. placing H-beams on the support structure equidistantly at a distance coinciding with the width of the modular panels; and
  b.2. placing the modular panels with their side faces fitting between the flanges of two contiguous beams.

16. The modular panel for thermal energy transfer according to claim 3, wherein the fixing support attached to said upper face is positioned between respective grooves in said lower face.

17. A modular panel for thermal energy transfer, particularly configured for being used in ceilings and walls, comprising:
  a heat-insulating layer forming a supporting structure demarcated by at least a lower face, an upper face, two side faces and two end faces;
  at least one conducting plate disposed on and attached to only the lower face of the heat-insulating layer and only partially covering the surface of said lower face, each conducting plate being formed by:
    a groove embedded in the heat-insulating layer defining a longitudinal cavity which is configured to house a hydraulic pipe, said groove in turn being finished by two longitudinal edges which are flush with the lower face, said groove defining a longitudinal opening which is configured to allow inserting the hydraulic pipe;
    a transfer plate extending from at least one of the longitudinal edges and extending on the lower face; and
    an elastic closure disposed in said longitudinal opening in leak-tight relation to said groove and configured to seal the longitudinal opening and press the hydraulic pipe against and into the groove.

18. The modular panel for thermal energy transfer according to claim 17, comprising a fixing support attached to the upper face, wherein the fixing support is positioned between respective grooves in said lower face.

* * * * *